United States Patent
Qawami et al.

(10) Patent No.: US 11,188,264 B2
(45) Date of Patent: Nov. 30, 2021

(54) CONFIGURABLE WRITE COMMAND DELAY IN NONVOLATILE MEMORY

(71) Applicant: Intel Corporation, Santa Clara, CA (US)

(72) Inventors: Shekoufeh Qawami, El Dorado Hills, CA (US); Philip Hillier, Rancho Santa Margarita, CA (US); Benjamin Graniello, Chandler, AZ (US); Rajesh Sundaram, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/780,632

(22) Filed: Feb. 3, 2020

(65) Prior Publication Data
US 2020/0174705 A1 Jun. 4, 2020

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 3/0613
See application file for complete search history.

(56) References Cited

U.S. PATENT DOCUMENTS

| | | | | |
|---|---|---|---|---|
| 6,088,774 A | * | 7/2000 | Gillingham | G06F 13/4243 365/194 |
| 6,977,655 B2 | * | 12/2005 | Ryan | G09G 5/39 345/533 |
| 7,340,577 B1 | * | 3/2008 | Dyke | G06F 13/4243 711/167 |
| 7,916,554 B2 | * | 3/2011 | Pawlowski | G11C 7/1072 365/189.04 |
| 2002/0078294 A1 | * | 6/2002 | Tsuchida | G11C 7/1072 711/105 |
| 2004/0165588 A1 | * | 8/2004 | Pandya | H04L 63/0272 370/389 |
| 2012/0023363 A1 | * | 1/2012 | Shaeffer | G06F 13/1689 714/6.11 |

(Continued)

OTHER PUBLICATIONS

T. Oh et al., "A 3.2 Gbps/pin 8 Gbit 1.0 V LPDDR4 SDRAM With Integrated ECC Engine for Sub-1 V DRAM Core Operation," in IEEE Journal of Solid-State Circuits, vol. 50, No. 1, pp. 178-190, Jan. 2015, doi: 10.1109/JSSC.2014.2353799. https://ieeexplore.IEEE.org/stamp/stamp.jsp?tp=&arnumber=6901299 (Year: 2015).*

(Continued)

*Primary Examiner* — Ernest Unelus
*Assistant Examiner* — Sakhr A Aldaylam
(74) *Attorney, Agent, or Firm* — Compass IP Law PC

(57) ABSTRACT

A memory system includes a nonvolatile (NV) memory device with asymmetry between intrinsic read operation delay and intrinsic write operation delay. The system can select to perform memory access operations with the NV memory device with the asymmetry, in which case write operations have a lower delay than read operations. The system can alternatively select to perform memory access operations with the NV memory device where a configured write operation delay that matches the read operation delay.

20 Claims, 8 Drawing Sheets

(56) References Cited

U.S. PATENT DOCUMENTS

2012/0039138 A1* 2/2012 Ware ............... G11C 7/106
                                              365/193
2017/0186471 A1* 6/2017 Qawami ............ G11C 29/022

OTHER PUBLICATIONS

Extended European Search Report for Patent Application No. 20215672.5, dated Jun. 14, 2021, 7 pages.

* cited by examiner

TABLE 400

| METRIC | 1R 2:1 256B | | 2R 2:1 256B | |
|---|---|---|---|---|
| | MIN WR LATENCY | WR/RD LATENCY MATCH | MIN WR LATENCY | WR/RD LATENCY MATCH |
| TRANSFER RATE (MT/s) | 2400 | 2400 | 2400 | 2400 |
| RAW BW (GB/s) | 19.2 | 19.2 | 19.2 | 19.2 |
| 2:1 EFFICIENCY | 57% | 68% | 77% | 87% |
| EFFECTIVE BW (GB/s) | 10.9 | 13.1 | 14.7 | 16.6 |
| TRANSFER RATE (MT/s) | 2800 | 2800 | 2800 | 2800 |
| RAW BW (GB/s) | 22.4 | 22.4 | 22.4 | 22.4 |
| 2:1 EFFICIENCY | 52% | 64% | 73% | 83% |
| EFFECTIVE BW (GB/s) | 11.8 | 14.4 | 16.3 | 18.6 |
| TRANSFER RATE (MT/s) | 3200 | 3200 | 3200 | 3200 |
| RAW BW (GB/s) | 25.6 | 25.6 | 25.6 | 25.6 |
| 2:1 EFFICIENCY | 50% | 62% | 70% | 81% |
| EFFECTIVE BW (GB/s) | 12.7 | 15.8 | 17.9 | 20.8 |
| TRANSFER RATE (MT/s) | 4000 | 4000 | 4000 | 4000 |
| RAW BW (GB/s) | 32.0 | 32.0 | 32.0 | 32.0 |
| 2:1 EFFICIENCY | 43% | 55% | 63% | 75% |
| EFFECTIVE BW (GB/s) | 13.8 | 17.7 | 20.3 | 24.1 |

FIG. 4

CONFIGURABLE WRITE COMMAND DELAY IN NONVOLATILE MEMORY

FIELD

Descriptions are generally related to memory devices, and more particular descriptions are related to configurable write command delay in a memory having different write command and read command delays.

BACKGROUND

Traditional memory devices, such as dynamic random access memory (DRAM) has matched latency between read operations and write operations. Thus, a controller can schedule the commands in any order, having a fixed latency between the sending of the command on the command bus and utilization of the data bus.

Emerging three dimensional (3D) crosspoint (3DXP) media has matched command and data utilization with nonuniform read and write latency. Thus, read and write commands take the same number of clock cycles (tCKs) to send on the command bus, and data takes the same number of clock cycles for read and write commands. However, the delay between the write commands to data on the data (DQ) bus is considerably shorter than the delay between read commands to data on the DQ bus.

The delay between write command and data on the DQ bus refers to the time the controller waits to drive data on the bus after sending a write command. Write commands can be performed as background, asynchronous processes, which means the controller can simply send the command and the data as soon after the command and then be free to perform other work. The delay between read command and data on the DQ bus refers to how long it takes the memory device to access data from the storage media and drive it onto the bus. The unmatched delays can create unusable gaps on the command bus or on the DQ bus, or on both the command and DQ buses. In workloads that have a mix of read and write commands, such gaps impact the maximum achievable bandwidth.

One traditional approach to address the bandwidth inefficiency resulting from the latency mismatch is to modify the command interface to have double the bandwidth of the data interface. However, such an approach requires an increase in controller and media power due to a higher bit rate or an increased number of command signal lines on the command bus.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

FIG. 4 is a table of an example of bus utilization data that illustrates improved utilization for a system with inherent read and write delay mismatch that implements selectable write delay.

Figure 1:
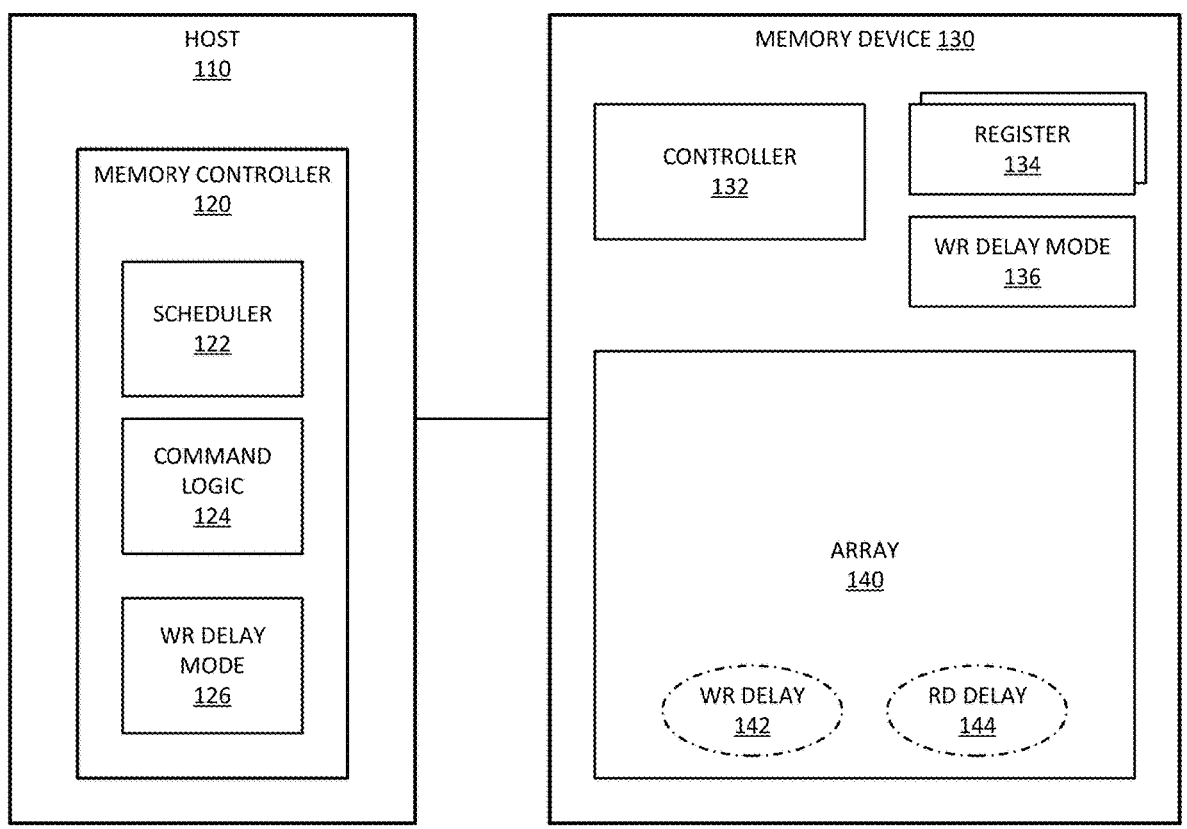
FIG. 1 is a block diagram of system having a native difference between read delay and write delay, which can select an unmatched write delay mode or a matched write delay mode.

Descriptions of certain details and implementations follow, including non-limiting descriptions of the figures, which may depict some or all examples, and well as other potential implementations.

DETAILED DESCRIPTION

As described herein, a memory system includes a nonvolatile (NV) memory device with asymmetry between intrinsic read operation delay and intrinsic write operation delay. The system can select to perform memory access operations with the NV memory device with the asymmetry, in which case write operations have a lower delay than read operations between the command and the use of the data bus, even though write operations can have a longer delay for completion than read operations. The system can alternatively select to perform memory access operations with the NV memory device where a configured write operation delay that matches the read operation delay.

In one example, the memory device includes a configurable mode or selectable mode for the storage media to program the write latency to either a component minimum value or to match the read latency. When the write latency is at the component minimum value, the write latency is based on the architecture of the storage media itself, and the minimum value defines a minimum delay required by the media between the command and the receipt of write data. The value to match the read latency causes memory device to add a delay to cause the write delay to match the read delay. In one example, the memory device matches the write latency to the read latency by cause an internal storage controller to internally add a delay to the write command to align the data bus utilization of a write command to the native delay for a read command. Such an approach can allow the memory device to treat the write command the same with respect to access to the media and the data bus, just delayed due to processing the command after a delay.

Programming or setting the write latency to match the read latency can allow the host controller to issue write or read commands based on command bus availability because the DQ availability will be the same for either command. Thus, selectively matching the write and read latency for certain workloads can increase DQ bus utilization, which improves bandwidth for the NV memory device. In one example, the NV memory device is nonvolatile storage having a three dimensional crosspoint (3DXP) memory array. As one specific example, the NV memory device can be an OPTANE product available from INTEL CORPORATION. Application of selectively matched write and read latency has been observed to improve data bus utilization and increase the overall bandwidth for a 3DXP device by approximately 10%.

A host controller or system controller manages access to the memory device. Allowing the host controller to selectively apply matched write and read latency can simplify the controller scheduler design to keep track of when to issue read commands or write commands to the memory device. Write/read latency matching can increase the bandwidth or performance achievable for use by the customer. In one example, the host controller can issue any command at any time, knowing the latency is the same for read and write, instead of mismatched based on inherent latencies.

Some memory technologies, such as DRAM (dynamic random access memory), have symmetrical latencies between read and write. Memory technologies with such symmetry do not have the latency mismatch inefficiencies. The programmable write delay can take an asymmetrical memory technology and cause it to perform as a symmetrical memory technology. The programmability enables the system to select unmatched or matched latencies depending on the workload. In one example, when the workload has a high proportion of writes, the system can select an unmatched mode to allow the memory device to use the minimum latency. In one example, when the workload has a mix of reads and writes, the system can select a matched latency mode to cause the read and write latencies to be symmetrical.

FIG. 1 is a block diagram of system having a native difference between read delay and write delay, which can select an unmatched write delay mode or a matched write delay mode. System 100 includes host 110 with memory controller 120 coupled to memory device 130.

Memory device 120 includes memory array 140, which represents an array of memory cells or storage cells. A memory cell stores a bit of data, or multiple bits for a multilevel cell. In one example, array 140 is separated as banks of memory or other subset of memory. In one example, memory device 130 is part of a group of memory devices where one or more memory devices are organized as a rank of memory. A rank of memory is a group of memory resources that share a chip select or enable signal and are thus accessed in parallel.

In one example, array 140 includes nonvolatile memory cells. A nonvolatile (NV) memory or NV memory device maintains its state even when power is interrupted to the memory. A volatile memory has indeterminate state if power is interrupted to the memory. In one example, the NV media of array 140 is a 3DXP media. Array 140 has an unmatched read command to DQ bus delay to write command to DQ bus delay. In one example, array 140 has matched command and data utilization with nonuniform read/write latency. With matched commands and data utilization, the read and write commands take the same number of tCKS or clock cycles, and data takes the same number of tCKs whether sent from memory device 130 in response to a read or send to memory device 130 in association with a write.

In one example, array 140 has NV media that has write (WR) delay 142 that is considerably shorter from command to DQ bus utilization than read (RD) delay 144. WR delay 142 and RD delay 144 represent intrinsic minimum value. The minimum value is a value that must be followed to ensure proper operation of the device. The delay can be considered an intrinsic delay when it is the delay associated with the physical and operational properties of the media itself. A difference in WR delay 142 and RD delay 144 creates unusable gaps on the command bus or the DQ bus or both the command bus and the DQ bus. In workloads with a mix of read and write commands, these gaps impact the maximum achievable bandwidth between memory device 130 and host 110 or memory controller 120.

Host 110 represents a computing platform to which memory device 130 is coupled. For example, host 110 can be or include a computer or other computing device. Memory controller 120 represents a controller to manage access to memory device 130. In one example, memory controller 120 is part of a host processor (not specifically shown) of host 110. Memory controller 120 could alternatively be considered a storage controller, depending on the connection of memory device 130. In one example, the nonvolatile memory of memory device 130 can be coupled to a storage bus such as a peripheral component interconnect express (PCIe) bus. In one example, the nonvolatile memory of memory device 130 is nonvolatile but is also byte addressable and random access and can be coupled to a system memory bus such as a double data rate (DDR) memory bus.

Memory controller 120 includes scheduler 122 to manage the scheduling and sending of sequences of commands to memory device 130. Scheduler 122 includes logic to determine the order of commands, as well as timing requirements for the commands. Memory controller 120 makes determinations of what commands to send in what order. Scheduler 122 determines the order of commands to ensure compliance with timing requirements. In one example, scheduler 122 determines what order to schedule commands to memory device 130 based on whether memory device 130 is configured to have WR delay 142 match RD delay 144, or whether WR delay 142 is unmatched relative to RD delay 144.

Memory controller 120 includes command logic 124 to generate commands to send to memory device 130. Commands can include Write commands or Read commands. Memory controller 120 sends read command over a command bus (not specifically shown), which can also be referred to as a command and address bus, and after a delay period memory device 130 will drive the data on the data bus (not specifically shown). Memory controller 120 sends a write command over the command bus and then sends data to the memory device over the data bus.

In one example, memory controller 120 includes WR delay mode 126, which indicates a delay mode for memory device 130. While memory controller 120 can set the delay mode for memory device 130, memory controller 120 can also track which delay mode is being applied by memory device 130. Memory controller 120 needs to know while delay mode is being applied to know how to schedule commands with scheduler 122, and also to know when the data bus is utilized.

Memory device 130 includes controller 132, which represents logic at the memory device to receive and decode commands from memory controller 120. Controller 132 represents control logic within memory device 130 and is separate from memory controller 120 of host 110. Controller 132 can trigger operations within memory device 130 to execute a command sent by memory controller 120.

Memory device 130 includes register 134, which represents one or more registers or storage locations to store configuration information or values related to the operation of memory device 130. In one example, register 134 includes one or more mode registers. In one example, register 134 includes configuration information to control a write delay mode for memory device 130. WR delay mode 136 represents the write delay mode within memory device 130.

In one example, WR delay mode 136 includes two modes: an unmatched mode, which could be referred to as a first mode; and a matched mode, which could be referred to as a second mode. The labels of first and second mode could be swapped in different implementations. The unmatched mode refers to a WR delay mode 136 where WR delay is different than RD delay. The matched mode refers to a WR delay mode 136 where the WR delay has an additional delay to match the RD delay. In one example, the WR delay mode dynamically configurable during runtime of the memory device 130. For example, the write mode can be dynamically set or dynamically configured by setting register 134 during operation of the memory.

In one example, when WR delay mode 136 indicates matched mode and when controller 132 receives a write command, controller 132 delays the processing of the write command by the difference or approximately the different between the intrinsic RD delay 144 and the intrinsic WR delay 142. Delaying by the difference in the two delays will extend the applied WR delay to match the RD delay. Thus, WR delay mode 136 can selectively change the asymmetry between WR delay 142 and RD delay 144 in a matched mode, or maintain an unmatched delay with an unmatched mode. In one example, WR delay mode 136 defaults to the unmatched mode. In one example, WR delay mode 136 defaults to the matched mode.

In one example, memory controller 120 determines what mode to set in memory device 130 based on the mix of read and write commands to be scheduled by scheduler 122. In one example, if the scheduler has mostly or primarily write operations to send to memory device 130, memory controller 120 sends a command to set register 134 to select the unmatched mode. The unmatched mode allows the scheduler to schedule the commands more closely together because there is a shorter delay for DQ bus availability. In one example, if the scheduler has a mix of read and write commands to send to memory device 130, memory controller 120 sends a command to set register 134 to select the matched mode. The matched mode allows the scheduler to send read and write commands in any order and can result in improved DQ bus utilization. It will be understood that in either case if the write delay mode is already set to the mode that is best for the workload to be scheduled, the memory controller does not need to send a command to change the WR delay mode.

Figure 2A:
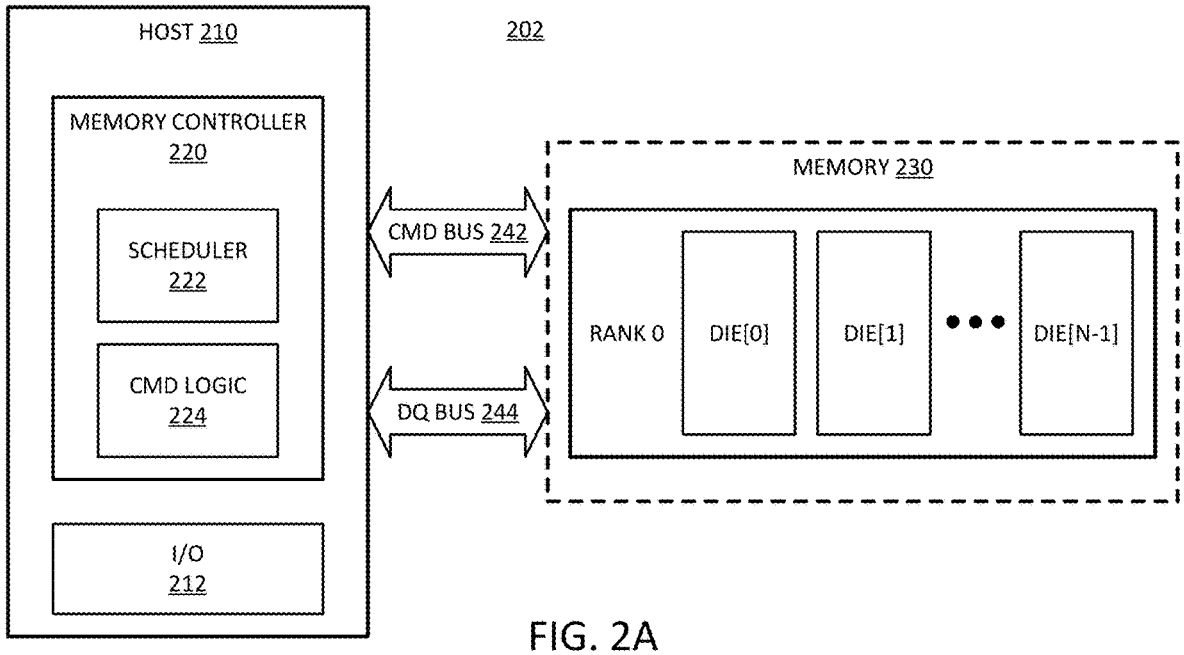
FIG. 2A is a block diagram of single-rank memory system that can select an unmatched write delay mode or a matched write delay mode.

FIG. 2A is a block diagram of single-rank memory system that can select an unmatched write delay mode or a matched write delay mode. System 202 represents elements of a computing system. System 202 can be considered to have a memory subsystem with memory controller 220 and memory 230. Host 210 represents the hardware platform that controls the memory subsystem. Host 210 includes one or more processors (e.g., a central processing unit (CPU) or a graphics processing unit (GPU)) that generate requests for data stored in memory 230.

Host 210 includes memory controller 220, which can be integrated onto a processor device. Memory controller 220 includes I/O (input/output) 212 to connect to memory 230. I/O includes connectors, signal lines, drivers, and other hardware to interconnect the memory devices to host 210. I/O 212 can include command I/O as represented by command (CMD) bus 242, and data I/O as represented by DQ (data) bus 244. CMD bus 242 includes command signal lines that enable memory controller 220 to send commands to memory 230. DQ bus 244 includes multiple data signal lines. For an N-bit interface, DQ bus 244 will include DQ[0:N−1]. for memory 230. The commands can be commands for data access (such as Read and Write) or commands for configuration (such as mode register commands). Memory controller 220 includes scheduler 222 to schedule when to send commands in a sequence of operations. Scheduler 222 can control the timing for I/O in accordance with known timing to improve the chance that I/O will be error free. The timing is set through training. The timing can be adjusted depending on a write delay mode of memory 230.

Memory 230 can include individual memory devices, or can represent a memory module. System 202 illustrates a single rank of memory devices in memory 230. A rank refers to a collection or group of memory devices that share a select line. Thus, memory devices in a rank will execute operations in parallel. Rank[0] is illustrated to include N memory dies, Die[(N−1):0]. N can be any integer 0 or more, for 1 or more memory dies.

With a single rank, system 202 cannot interleave access between ranks. Even without the ability to interleave access, system 202 can benefit from the ability to select between a matched write delay and an unmatched write delay. System 202 can implement write delay selection in accordance with an example of system 100.

Figure 2B:
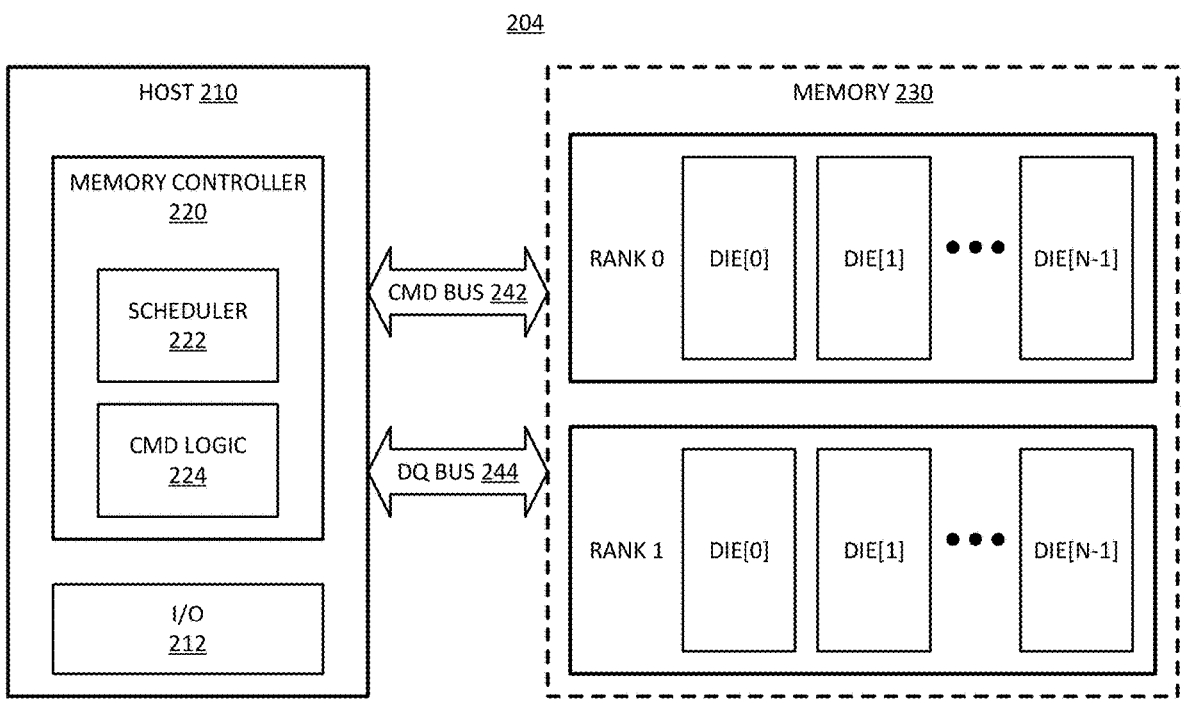
FIG. 2B is a block diagram of two-rank memory system that can select an unmatched write delay mode or a matched write delay mode.

FIG. 2B is a block diagram of two-rank memory system that can select an unmatched write delay mode or a matched write delay mode. System 204 represents an example of system 202. Host 210, memory controller 220, scheduler 222, command logic 224, I/O 212, CMD bus 242, and DQ bus 244 can be described as they are described above with respect to system 202.

Memory 230 can include individual memory devices, or can represent a memory module. System 204 illustrates two ranks of memory devices in memory 230. Rank[0] is illustrated to include N memory dies, Die[(N−1):0]. N can be any integer 0 or more, for 1 or more memory dies. Rank[1] is also illustrated to include N memory dies, Die[(N−1):0].

With two rank, system 204 can interleave access between ranks. While a two-rank system is illustrated as an example, it will be understood that systems having more than two ranks could also benefit from interleaving and are expected to have similar benefits from a matched write delay mode. Interleaving access between the ranks refers to toggling access from one rank to the other. Thus, memory controller 220 can toggle the sending of command between ranks during the write operation delay and the read operation delay. If the memory system has at least two devices per channel, memory controller 220 can write to one of the ranks and read from the other. A one rank system has a single device or single die or single group of devices per channel. The ability to interleave access among different ranks enables system 204 to benefit from the ability to select between a matched write delay and an unmatched write delay, and also improves bandwidth utilization. System 204 can implement write delay selection in accordance with an example of system 100.

Figure 3:
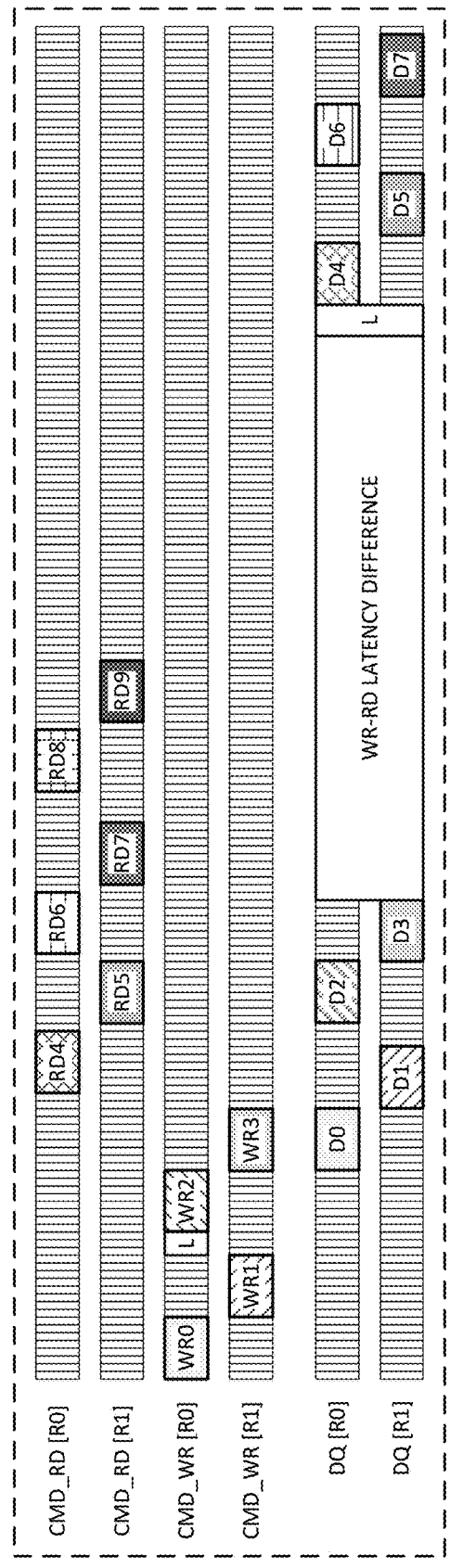
FIG. 3 is a timing diagram of an example of a system with inherent read and write delay mismatch that has selectable write delay.
Figure 3:
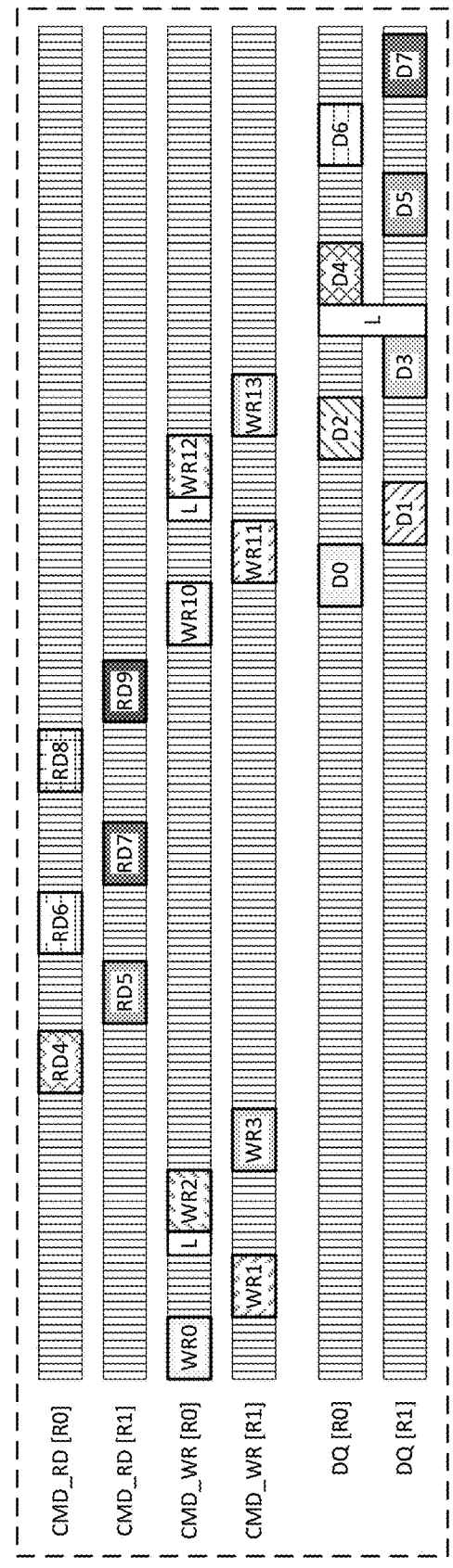

FIG. 3 is a timing diagram of an example of a system with inherent read and write delay mismatch that has selectable write delay. Diagram 310 illustrates a timing diagram for a scenario where there is latency mismatch between WR delay and RD delay. Diagram 310 can illustrate an unmatched WR latency mode selection by an example of system 100.

Diagram 320 illustrates a timing diagram for a scenario where latency is matched between WR delay and RD delay. Diagram 320 can illustrate a matched WR latency mode selection by an example of system 100.

Diagrams 310 and 320 illustrate specific examples for a specific system configuration. It will be understood that different timing can be used for different system configurations. Additionally, different devices may have different characteristics that will result in a different system operation.

In diagrams 310 and 320, each segment of the timing diagram represents a clock cycle. In the illustrated example, a read command or a write command takes 8 clock cycles (8 tCK) to issue. Additionally, it takes 8 clock cycles for the data cycle for a write command or a read command. It will be understood that the data cycle can be different from 8tCK, but 8 clock cycles is provided as an example for diagram 310 and 320.

The reads and writes are labeled in sequence to identify the timing flow of the command to the data associated with the specific command on the DQ bus. In diagram 310, R0 indicates Rank[0] and R1 indicates Rank[1]. Thus, it will be understood that diagram 310 represents a two-rank system, and commands on the command bus indicate toggling between two ranks. Additionally, there is a DQ[R0] to represent the data bus for Rank[0] and a DQ[R1] to represent the data bus for Rank[1].

Starting from the left of the diagram, the first command is a Write on Rank[0] (command WR0), followed by WR1 on Rank[1], WR2 on Rank[0], and WR3 on Rank[1]. The "L" before WR2 indicates a required WR-to-WR delay for the system. The delay may be different for different systems, and is illustrated only for example.

In diagram 310, D0 corresponding to WR0 appears on DQ[R0] after approximately 19 tCK, which can represent a minimum WR delay for the media. D1 follows on DQ[R1], followed by D2 on DQ[R0], followed by D3 on DQ[R1]. D1, D2, and D3 follow after similar delays with respect to their write commands.

Diagram 310 also illustrates RD4 on Rank[0], RD5 on Rank[1], RD6 on Rank[0], RD7 on Rank[1], RD8 on Rank[0], and RD9 on Rank[1]. In one example, the access can include an identification signal or other such signal to precede the read commands, as a transition from write to read. Such signaling is not necessary for all implementations, and is thus not included in the diagram. The white block across the DQ buses is labeled WR-RD latency difference, and indicates the long delay between the read commands and the read data on the DQ bus. It will be observed that the delay is much longer than the minimal delay for the write data. In one example tested, the latency difference was 73 tCK at 2400 MT/s, 97 tCK at 3200 MT/s, and 126 tCK at 4000 MT/s.

After the difference in read and write latency block, there is a block labeled "L" on the data bus that represents an inherent latency in the system when switching between write and read. The delay may be different in different systems. The purpose of illustrating the delay in diagram 310 is to indicate that there may be inherent system delays that are presents even when the WR delay is matched to the RD delay. Not all delays or signaling is illustrated in diagram 310.

After the delay, D4 corresponding to WR4 appears on DQ[R0], followed by D5 on DQ[R1], followed by D6 on DQ[R0], followed by D7 on DQ[R1]. D5, D6, and D7 follow after similar delays with respect to their read commands. The data D8 and D9 are not illustrated in diagram 310, but would follow in similar fashion.

Diagram 310 illustrates an example for a 3DXP memory where the delay between write command and write data delay is considerably shorter than read command and read data delay on the DQ bus. The asymmetry or mismatch of the delay can create a scenario where although the command or CA bus is available to issue commands, the memory controller has to ensure data from a previous read command will not collide with a time when data is needed for a write command. To avoid collisions, the memory controller traditionally inserts idle states. The box indicating the latency different is an example of a DQ idle state.

In diagram 320, the write command and read command sequence is identical to what is illustrated in diagram 310. Starting from the left of the diagram, the first command is a Write on Rank[0] (command WR0), followed by WR1 on Rank[1], WR2 on Rank[0], and WR3 on Rank[1]. In diagram 320, D0 corresponding to WR0 appears on DQ[R0] after a time that is matched to the read delay. The diagram may not be completely accurate due to additional signal and delays that may be added; however, the delay is shown as in the range of 100 tCK for the example in diagram 320. In addition to signaling that may not be shown, the delay may change due to transfer rate or other factors. Whatever the exact number of cycles, diagram 320 illustrates that the delay from WR command to WR data is matched to the delay from RD command to RD data. D1 follows on DQ[R1], followed by D2 on DQ[R0], followed by D3 on DQ[R1]. D1, D2, and D3 follow after similar delays with respect to their write commands.

Diagram 320 also illustrates RD4 on Rank[0], RD5 on Rank[1], RD6 on Rank[0], RD7 on Rank[1], RD8 on Rank[0], and RD9 on Rank[1]. In one example, a media controller (not shown) adds a delay to eliminate the WR-RD latency difference illustrated in diagram 310. Thus, the delay for reads and writes is the same in diagram 320. In one example, a memory controller selectively places the memory device in an unmatched mode, in which case read and write timing could be similar to what is shown in diagram 310. The memory controller can selectively place the memory device in a matched mode, in which case read and write timing could be similar to what is shown in diagram 320.

In diagram 320, after the same delay applied from write command to write data, the read data appears on the DQ buses after the read commands. Thus, D4 corresponding to WR4 appears on DQ[R0], followed by D5 on DQ[R1], followed by D6 on DQ[R0], followed by D7 on DQ[R1]. D4, D5, D6, and D7 follow after similar delays with respect to their read commands as D0, D1, D2, and D3 do after their respective write commands. The data D8 and D9 are not illustrated in diagram 320, but would follow in similar fashion.

It will be understood that the completion of a write operation (receiving and executing a write command), is longer in the example of diagram 320 than in the example of diagram 310. Despite the longer write completion time, the system sees an increase bus utilization due to matching latency when a mix of write and read is present. In one example, the system can toggle between unmatched delay mode and matched delay mode based on the type operations to be scheduled. Minimal write latency can be an advantage when the majority of operations involve write commands.

FIG. 4 is a table of an example of bus utilization data that illustrates improved utilization for a system with inherent read and write delay mismatch that implements selectable write delay. Table 400 illustrates an example of test results for a system in accordance with system 100, with a NV memory device.

There are four metrics that were measured: transfer rate in mega transfers per second (MT/s), raw bandwidth (BW) in gigabytes per second (GB/s), 2:1 efficiency for 2 reads per 1 write, and effective BW in GB/s. The first two columns of results illustrate results for a one rank (1R) system with 2:1 read to write in a 256 byte workload. The column that is darker shaded shows results for a minimum WR latency or unmatched delay mode, and the column that is lighter shows results for a WR/RD latency match mode.

For a one-rank system operating at 2400 MT/s, the raw BW for both the unmatched and matched cases was 19.2 GB/s. The unmatched latency 2:1 efficiency was 57% while the 2:1 efficiency for the matched latency was 68%. The change to the matched latency improved the effective bandwidth from 10.9 GB/s for unmatched to 13.1 GB/s for the matched mode.

For a two-rank system operating at 2400 MT/s, the raw BW for both the unmatched and matched cases was 19.2 GB/s. The unmatched latency 2:1 efficiency was 77% while the 2:1 efficiency for the matched latency was 87%. The ability to toggle between ranks improves the bandwidth utilization with respect to the single rank system. In the two-rank system, the change to the matched latency improved the effective bandwidth from 14.7 GB/s for unmatched to 16.6 GB/s for the matched mode.

For a one-rank system operating at 2800 MT/s, the raw BW for both the unmatched and matched cases was 22.4 GB/s. The unmatched latency 2:1 efficiency was 52% while the 2:1 efficiency for the matched latency was 64%. The change to the matched latency improved the effective bandwidth from 11.8 GB/s for unmatched to 14.4 GB/s for the matched mode.

For a two-rank system operating at 2800 MT/s, the raw BW for both the unmatched and matched cases was 22.4 GB/s. The unmatched latency 2:1 efficiency was 73% while the 2:1 efficiency for the matched latency was 83%. In the two-rank system, the change to the matched latency improved the effective bandwidth from 16.3 GB/s for unmatched to 18.6 GB/s for the matched mode. Thus, for both one-rank and two-rank systems, the higher raw bandwidth decreased the 2:1 efficiency but improved the effective bandwidth.

For a one-rank system operating at 3200 MT/s, the raw BW for both the unmatched and matched cases was 25.6 GB/s. The unmatched latency 2:1 efficiency was 50% while the 2:1 efficiency for the matched latency was 62%. The change to the matched latency improved the effective bandwidth from 12.7 GB/s for unmatched to 15.8 GB/s for the matched mode.

For a two-rank system operating at 3200 MT/s, the raw BW for both the unmatched and matched cases was 25.6 GB/s. The unmatched latency 2:1 efficiency was 70% while the 2:1 efficiency for the matched latency was 81%. In the two-rank system, the change to the matched latency improved the effective bandwidth from 17.9 GB/s for unmatched to 20.8 GB/s for the matched mode.

For a one-rank system operating at 4000 MT/s, the raw BW for both the unmatched and matched cases was 32.0 GB/s. The unmatched latency 2:1 efficiency was 43% while the 2:1 efficiency for the matched latency was 55%. The change to the matched latency improved the effective bandwidth from 13.8 GB/s for unmatched to 17.7 GB/s for the matched mode.

For a two-rank system operating at 4000 MT/s, the raw BW for both the unmatched and matched cases was 32.0 GB/s. The unmatched latency 2:1 efficiency was 63% while the 2:1 efficiency for the matched latency was 75%. In the two-rank system, the change to the matched latency improved the effective bandwidth from 20.3 GB/s for unmatched to 24.1 GB/s for the matched mode.

In each testing circumstance, the two-rank system provided improvement over the comparable one-rank system. Additionally, the ability to select to match the WR delay to the RD delay also significantly improved system performance over the comparable system that had unmatched WR/RD latency, in both the one-rank and two-rank systems.

Figure 5:
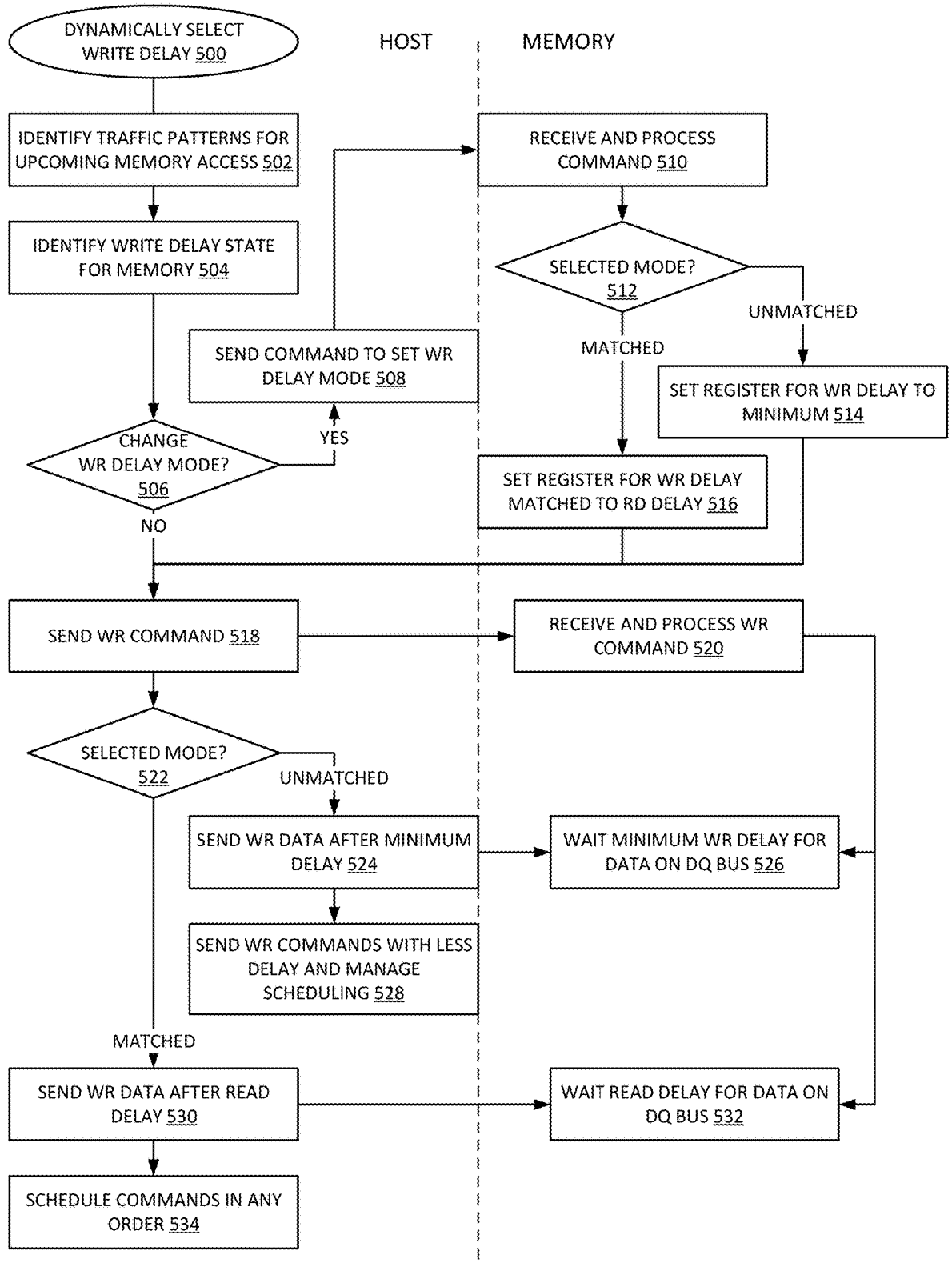
FIG. 5 is a flow diagram of an example of a process for selectable write delay in a system having inherent read and write delay mismatch.

FIG. 5 is a flow diagram of an example of a process for selectable write delay in a system having inherent read and write delay mismatch. Process 500 represents a process that can be applied in a memory system in accordance with any example herein. As a specific example, process 500 for dynamically selecting write delay can be applied by system 100 of FIG. 1, system 202 of FIG. 2A, or system 204 of FIG. 2B.

The operations represented on the left side of the dashed line can be performed by a host, such as a host controller or memory controller. The operations represented on the right side of the dashed line can be performed by the memory device itself.

In one example, the host identifies traffic patterns for upcoming memory accesses to be scheduled, block 502. The host can identify the write delay state for the memory to be accessed, block 504. If the write delay state is not the write delay desired for the upcoming memory access, the system can determine to change the write delay mode for the memory device. In one example, the host makes the determination based on what write delay mode the memory device is currently applying, and what write delay mode would be preferred for the upcoming traffic patterns.

If the host is to change the write (WR) delay mode, block 506 YES branch, in one example, the host sends a command to set the write delay mode or cause the memory to set the write delay mode, block 508. In one example, the host sends a mode register write command or other command to change a configuration setting of the memory device.

The memory receives and processes the command, block 510. The memory device can determine whether to set the write delay mode to an unmatched delay mode or to a matched delay mode, depending on the selected mode, block 512. The unmatched delay mode refers to a mode where write delay and read delay are left at their asymmetric values. The matched delay mode refers to a mode where the write delay and read delay are set to be equal.

If the selected mode is unmatched, in one example, the memory can set a configuration register to set write delay to the minimum delay for the storage media, to be unmatched relative to the read delay, block 514. If the selected mode is matched, in one example, the memory can set a configuration register to set write delay to be matched relative to read delay, block 516.

The host can send a write command, block 518. In response to the write command, the memory can receive and process the write command, block 520. After sending the write command, block 518, if the selected mode is unmatched, block 522 UNMATCHED branch, in one example, the host sends write data after the media minimum delay, block 524. The minimum delay can refer to the native delay inherent to the storage media. Instead of waiting to place data on the data bus for a write, the host can send the data as soon as minimum timings are satisfied. The memory receives and decodes the command, and waits the minimum WR delay for data on the DQ bus, block 526. The host can send other write commands with less delay between command and data, block 528, which will require additional scheduling complexity due to the mismatch in data bus availability relative to data commands. Such complexity can restrict the scheduling of reads and writes by the scheduler.

If the selected mode is matched, block 522 MATCHED branch, in one example, the host sends write data after the read delay, block 530. The read delay is longer than the native delay inherent to the storage media for writes. Instead of sending the data as soon as the minimum timings are satisfied, the host will wait to send the data at a later time so the data bus utilization has the same delay between read commands and write commands. The memory receives and decodes the command, and waits the read delay for the data on the DQ bus, block 532.

Thus, in one example, the host will ensure that utilization of the data bus is at the same delay after a command, whether the host is accessing the data bus to receive data in response to a read, or whether the host accesses the bus after a write command to send data to the memory. The host can send other access commands with less complexity, allowing the scheduler to schedule the commands in any order, block 534.

Figure 6:
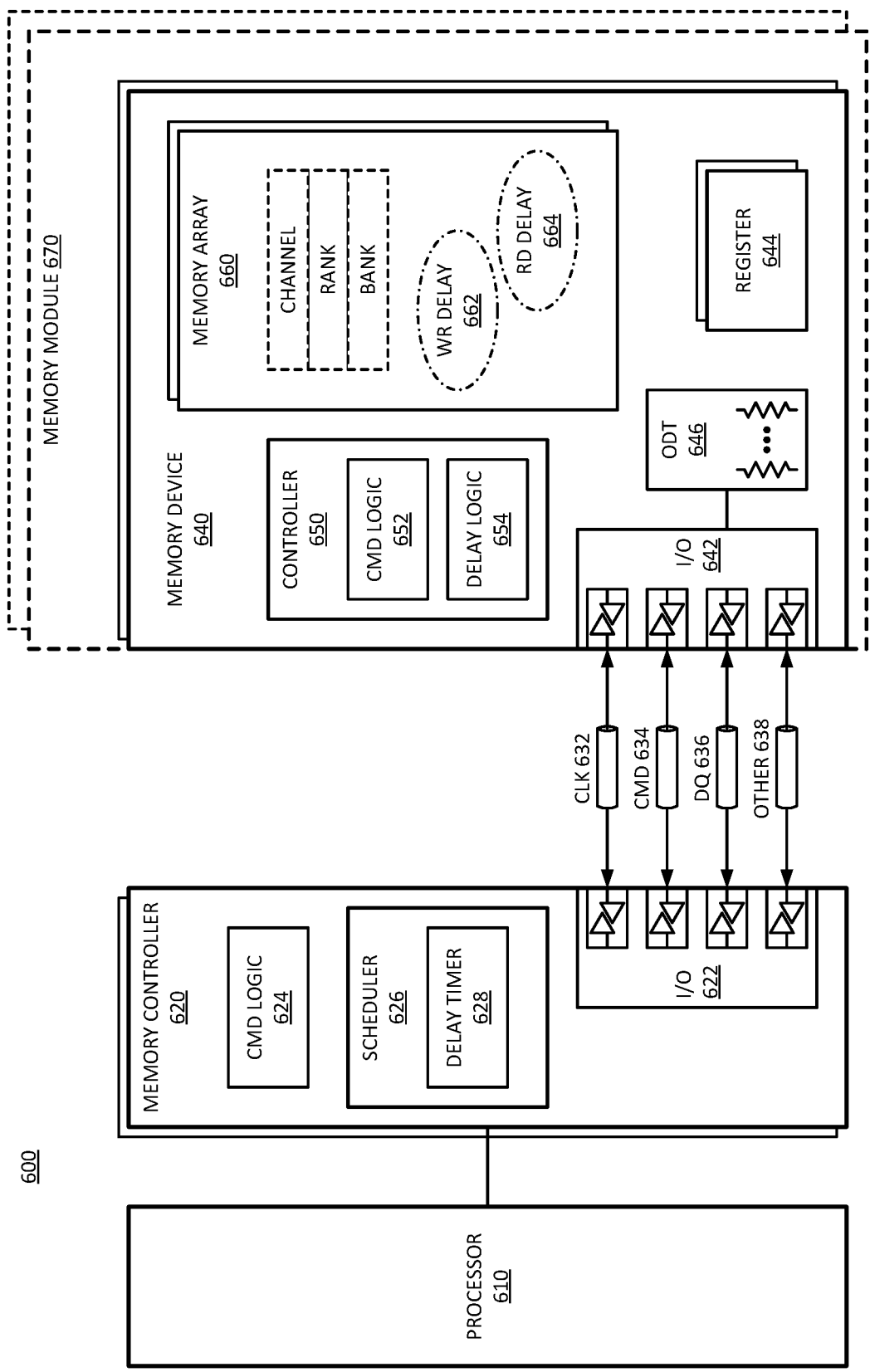
FIG. 6 is a block diagram of an example of a memory subsystem in which selectable write delay can be implemented.

FIG. 6 is a block diagram of an example of a memory subsystem in which selectable write delay can be implemented. System 600 includes a processor and elements of a memory subsystem in a computing device. System 600 provides an example of a system in accordance with system 100 of FIG. 1, system 202 of FIG. 2A, or system 204 of FIG. 2B.

In one example, memory array 660 represents a storage media that has asymmetry between read command to data bus utilization delay (read (RD) delay 664) and write command to data bus utilization delay (write (WR) delay 662). In one example, write delay 662 is selectable, either to be unmatched with respect to read delay 664, or to be matched with respect to read delay 664. The selection and application of write delay 662 can be in accordance with any example herein. In one example, scheduler 626 of memory controller 620 includes delay timer 628 to apply timing delay to command and data scheduling based on the write delay mode selected for memory device 640. Delay logic 654 can represent logic in memory device 640 to apply the write delay mode and add delay to write commands to comply with the selected mode.

Processor 610 represents a processing unit of a computing platform that may execute an operating system (OS) and applications, which can collectively be referred to as the host or the user of the memory. The OS and applications execute operations that result in memory accesses. Processor 610 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory accesses may also be initiated by devices such as a network controller or hard disk controller. Such devices can be integrated with the processor in some systems or attached to the processor via a bus (e.g., PCI express), or a combination. System 600 can be implemented as an SOC (system on a chip), or be implemented with standalone components.

In one example, reference to memory devices can refer to a nonvolatile memory device whose state is determinate even if power is interrupted to the device. In one example, the nonvolatile memory device is a block addressable memory device, such as NAND or NOR technologies. Thus, a memory device can also include a future generation nonvolatile devices, such as a three dimensional crosspoint memory device, other byte addressable nonvolatile memory devices. A memory device can include a nonvolatile, byte addressable media that stores data based on a resistive state of the memory cell, or a phase of the memory cell. In one example, the memory device can use chalcogenide phase change material (e.g., chalcogenide glass). In one example, the memory device can be or include multi-threshold level NAND flash memory, NOR flash memory, single or multi-level phase change memory (PCM) or phase change memory with a switch (PCMS), a resistive memory, nanowire memory, ferroelectric transistor random access memory (FeTRAM), magnetoresistive random access memory (MRAM) memory that incorporates memristor technology, or spin transfer torque (STT)-MRAM, or a combination of any of the above, or other memory.

Memory controller 620 represents one or more memory controller circuits or devices for system 600. Memory controller 620 represents control logic that generates memory access commands in response to the execution of operations by processor 610. Memory controller 620 accesses one or more memory devices 640. Memory devices 640 can be DRAM devices in accordance with any referred to above. In one example, memory devices 640 are organized and managed as different channels, where each channel couples to buses and signal lines that couple to multiple memory devices in parallel. Each channel is independently operable. Thus, each channel is independently accessed and controlled, and the timing, data transfer, command and address exchanges, and other operations are separate for each channel. Coupling can refer to an electrical coupling, communicative coupling, physical coupling, or a combination of these. Physical coupling can include direct contact. Electrical coupling includes an interface or interconnection that allows electrical flow between components, or allows signaling between components, or both. Communicative coupling includes connections, including wired or wireless, that enable components to exchange data.

In one example, settings for each channel are controlled by separate mode registers or other register settings. In one example, each memory controller 620 manages a separate memory channel, although system 600 can be configured to have multiple channels managed by a single controller, or to have multiple controllers on a single channel. In one example, memory controller 620 is part of host processor 610, such as logic implemented on the same die or implemented in the same package space as the processor.

Memory controller 620 includes I/O interface logic 622 to couple to a memory bus, such as a memory channel as referred to above. I/O interface logic 622 (as well as I/O interface logic 642 of memory device 640) can include pins, pads, connectors, signal lines, traces, or wires, or other hardware to connect the devices, or a combination of these. I/O interface logic 622 can include a hardware interface. As illustrated, I/O interface logic 622 includes at least drivers/transceivers for signal lines. Commonly, wires within an integrated circuit interface couple with a pad, pin, or connector to interface signal lines or traces or other wires between devices. I/O interface logic 622 can include drivers, receivers, transceivers, or termination, or other circuitry or combinations of circuitry to exchange signals on the signal lines between the devices. The exchange of signals includes at least one of transmit or receive. While shown as coupling I/O 622 from memory controller 620 to I/O 642 of memory device 640, it will be understood that in an implementation of system 600 where groups of memory devices 640 are accessed in parallel, multiple memory devices can include I/O interfaces to the same interface of memory controller 620. In an implementation of system 600 including one or more memory modules 670, I/O 642 can include interface hardware of the memory module in addition to interface hardware on the memory device itself. Other memory controllers 620 will include separate interfaces to other memory devices 640.

The bus between memory controller 620 and memory devices 640 can be implemented as multiple signal lines coupling memory controller 620 to memory devices 640. The bus may typically include at least clock (CLK) 632, command/address (CMD) 634, and write data (DQ) and read data (DQ) 636, and zero or more other signal lines 638. In one example, a bus or connection between memory controller 620 and memory can be referred to as a memory bus. In one example, the memory bus is a multi-drop bus. The signal lines for CMD can be referred to as a "C/A bus" (or ADD/CMD bus, or some other designation indicating the transfer of commands (C or CMD) and address (A or ADD) information) and the signal lines for write and read DQ can be referred to as a "data bus." In one example, independent channels have different clock signals, C/A buses, data buses, and other signal lines. Thus, system 600 can be considered to have multiple "buses," in the sense that an independent interface path can be considered a separate bus. It will be understood that in addition to the lines explicitly shown, a bus can include at least one of strobe signaling lines, alert lines, auxiliary lines, or other signal lines, or a combination. It will also be understood that serial bus technologies can be used for the connection between memory controller 620 and memory devices 640. An example of a serial bus technology is 8B10B encoding and transmission of high-speed data with embedded clock over a single differential pair of signals in each direction. In one example, CMD 634 represents signal lines shared in parallel with multiple memory devices. In one example, multiple memory devices share encoding command signal lines of CMD 634, and each has a separate chip select (CS_n) signal line to select individual memory devices.

It will be understood that in the example of system 600, the bus between memory controller 620 and memory devices 640 includes a subsidiary command bus CMD 634 and a subsidiary bus to carry the write and read data, DQ 636. In one example, the data bus can include bidirectional lines for read data and for write/command data. In another example, the subsidiary bus DQ 636 can include unidirectional write signal lines for write and data from the host to memory, and can include unidirectional lines for read data from the memory to the host. In accordance with the chosen memory technology and system design, other signals 638 may accompany a bus or sub bus, such as strobe lines DQS. Based on design of system 600, or implementation if a design supports multiple implementations, the data bus can have more or less bandwidth per memory device 640. For example, the data bus can support memory devices that have either a x4 interface, a x8 interface, a x16 interface, or other interface. The convention "xW," where W is an integer that refers to an interface size or width of the interface of memory device 640, which represents a number of signal lines to exchange data with memory controller 620. The interface size of the memory devices is a controlling factor on how many memory devices can be used concurrently per channel in system 600 or coupled in parallel to the same signal lines. In one example, high bandwidth memory devices, wide interface devices, or stacked memory configurations, or combinations, can enable wider interfaces, such as a x128 interface, a x256 interface, a x512 interface, a x1024 interface, or other data bus interface width.

In one example, memory devices 640 and memory controller 620 exchange data over the data bus in a burst, or a sequence of consecutive data transfers. The burst corresponds to a number of transfer cycles, which is related to a bus frequency. In one example, the transfer cycle can be a whole clock cycle for transfers occurring on a same clock or strobe signal edge (e.g., on the rising edge). In one example, every clock cycle, referring to a cycle of the system clock, is separated into multiple unit intervals (UIs), where each UI is a transfer cycle. For example, double data rate transfers trigger on both edges of the clock signal (e.g., rising and falling). A burst can last for a configured number of UIs, which can be a configuration stored in a register, or triggered on the fly. For example, a sequence of eight consecutive transfer periods can be considered a burst length eight (BL8), and each memory device 640 can transfer data on each UI. Thus, a x8 memory device operating on BL8 can transfer 64 bits of data (8 data signal lines times 8 data bits transferred per line over the burst). It will be understood that this simple example is merely an illustration and is not limiting.

Memory devices 640 represent memory resources for system 600. In one example, each memory device 640 is a separate memory die. In one example, each memory device 640 can interface with multiple (e.g., 2) channels per device or die. Each memory device 640 includes I/O interface logic 642, which has a bandwidth determined by the implementation of the device (e.g., x16 or x8 or some other interface bandwidth). I/O interface logic 642 enables the memory devices to interface with memory controller 620. I/O interface logic 642 can include a hardware interface, and can be in accordance with I/O 622 of memory controller, but at the memory device end. In one example, multiple memory devices 640 are connected in parallel to the same command and data buses. In another example, multiple memory devices 640 are connected in parallel to the same command bus, and are connected to different data buses. For example, system 600 can be configured with multiple memory devices 640 coupled in parallel, with each memory device responding to a command, and accessing memory resources 660 internal to each. For a Write operation, an individual memory device 640 can write a portion of the overall data word, and for a Read operation, an individual memory device 640 can fetch a portion of the overall data word. The remaining bits of the word will be provided or received by other memory devices in parallel.

In one example, memory devices 640 are disposed directly on a motherboard or host system platform (e.g., a PCB (printed circuit board) on which processor 610 is disposed) of a computing device. In one example, memory devices 640 can be organized into memory modules 670. In one example, memory modules 670 represent dual inline memory modules (DIMMs). In one example, memory modules 670 represent other organization of multiple memory devices to share at least a portion of access or control circuitry, which can be a separate circuit, a separate device, or a separate board from the host system platform. Memory modules 670 can include multiple memory devices 640, and the memory modules can include support for multiple separate channels to the included memory devices disposed on them. In another example, memory devices 640 may be incorporated into the same package as memory controller 620, such as by techniques such as multi-chip-module (MCM), package-on-package, through-silicon via (TSV), or other techniques or combinations. Similarly, in one example, multiple memory devices 640 may be incorporated into memory modules 670, which themselves may be incorporated into the same package as memory controller 620. It will be appreciated that for these and other implementations, memory controller 620 may be part of host processor 610.

Memory devices 640 each include one or more memory arrays 660. Memory array 660 represents addressable memory locations or storage locations for data. Typically, memory array 660 is managed as rows of data, accessed via wordline (rows) and bitline (individual bits within a row) control. Memory array 660 can be organized as separate channels, ranks, banks, or partitions of memory. Channels may refer to independent control paths to storage locations within memory devices 640. Ranks may refer to common locations across multiple memory devices (e.g., same row addresses within different devices) in parallel. Banks may refer to sub-arrays of memory locations within a memory device 640. In one example, banks of memory are divided into sub-banks with at least a portion of shared circuitry (e.g., drivers, signal lines, control logic) for the sub-banks, allowing separate addressing and access. It will be understood that channels, ranks, banks, sub-banks, bank groups, or other organizations of the memory locations, and combinations of the organizations, can overlap in their application to physical resources. For example, the same physical memory locations can be accessed over a specific channel as a specific bank, which can also belong to a rank. Thus, the organization of memory resources will be understood in an inclusive, rather than exclusive, manner.

In one example, memory devices 640 include one or more registers 644. Register 644 represents one or more storage devices or storage locations that provide configuration or settings for the operation of the memory device. In one example, register 644 can provide a storage location for memory device 640 to store data for access by memory controller 620 as part of a control or management operation. In one example, register 644 includes one or more Mode Registers. In one example, register 644 includes one or more multipurpose registers. The configuration of locations within register 644 can configure memory device 640 to operate in different "modes," where command information can trigger different operations within memory device 640 based on the mode. Additionally or in the alternative, different modes can also trigger different operation from address information or other signal lines depending on the mode. Settings of register 644 can indicate configuration for I/O settings (e.g., timing, termination or ODT (on-die termination) 646, driver configuration, or other I/O settings).

In one example, memory device 640 includes ODT 646 as part of the interface hardware associated with I/O 642. ODT 646 can be configured as mentioned above, and provide settings for impedance to be applied to the interface to specified signal lines. In one example, ODT 646 is applied to DQ signal lines. In one example, ODT 646 is applied to command signal lines. In one example, ODT 646 is applied to address signal lines. In one example, ODT 646 can be applied to any combination of the preceding. The ODT settings can be changed based on whether a memory device is a selected target of an access operation or a non-target device. ODT 646 settings can affect the timing and reflections of signaling on the terminated lines. Careful control over ODT 646 can enable higher-speed operation with improved matching of applied impedance and loading. ODT 646 can be applied to specific signal lines of I/O interface 642, 622 (for example, ODT for DQ lines or ODT for CA lines), and is not necessarily applied to all signal lines.

Memory device 640 includes controller 650, which represents control logic within the memory device to control internal operations within the memory device. For example, controller 650 decodes commands sent by memory controller 620 and generates internal operations to execute or satisfy the commands. Controller 650 can be referred to as an internal controller, and is separate from memory controller 620 of the host. Controller 650 can determine what mode is selected based on register 644, and configure the internal execution of operations for access to memory resources 660 or other operations based on the selected mode. Controller 650 generates control signals to control the routing of bits within memory device 640 to provide a proper interface for the selected mode and direct a command to the proper memory locations or addresses. Controller 650 includes command logic 652, which can decode command encoding received on command and address signal lines. Thus, command logic 652 can be or include a command decoder. With command logic 652, memory device can identify commands and generate internal operations to execute requested commands.

Referring again to memory controller 620, memory controller 620 includes command (CMD) logic 624, which represents logic or circuitry to generate commands to send to memory devices 640. The generation of the commands can refer to the command prior to scheduling, or the preparation of queued commands ready to be sent. Generally, the signaling in memory subsystems includes address information within or accompanying the command to indicate or select one or more memory locations where the memory devices should execute the command. In response to scheduling of transactions for memory device 640, memory controller 620 can issue commands via I/O 622 to cause memory device 640 to execute the commands. In one example, controller 650 of memory device 640 receives and decodes command and address information received via I/O 642 from memory controller 620. Based on the received command and address information, controller 650 can control the timing of operations of the logic and circuitry within memory device 640 to execute the commands. Controller 650 is responsible for compliance with standards or specifications within memory device 640, such as timing and signaling requirements. Memory controller 620 can implement compliance with standards or specifications by access scheduling and control.

Memory controller 620 includes scheduler 626, which represents logic or circuitry to generate and order transactions to send to memory device 640. From one perspective, the primary function of memory controller 620 could be said to schedule memory access and other transactions to memory device 640. Such scheduling can include generating the transactions themselves to implement the requests for data by processor 610 and to maintain integrity of the data (e.g., such as with commands related to refresh). Transactions can include one or more commands, and result in the transfer of commands or data or both over one or multiple timing cycles such as clock cycles or unit intervals. Transactions can be for access such as read or write or related commands or a combination, and other transactions can include memory management commands for configuration, settings, data integrity, or other commands or a combination.

Memory controller 620 typically includes logic such as scheduler 626 to allow selection and ordering of transactions to improve performance of system 600. Thus, memory controller 620 can select which of the outstanding transactions should be sent to memory device 640 in which order, which is typically achieved with logic much more complex that a simple first-in first-out algorithm. Memory controller 620 manages the transmission of the transactions to memory device 640, and manages the timing associated with the transaction. In one example, transactions have deterministic timing, which can be managed by memory controller 620 and used in determining how to schedule the transactions with scheduler 626.

Figure 7:
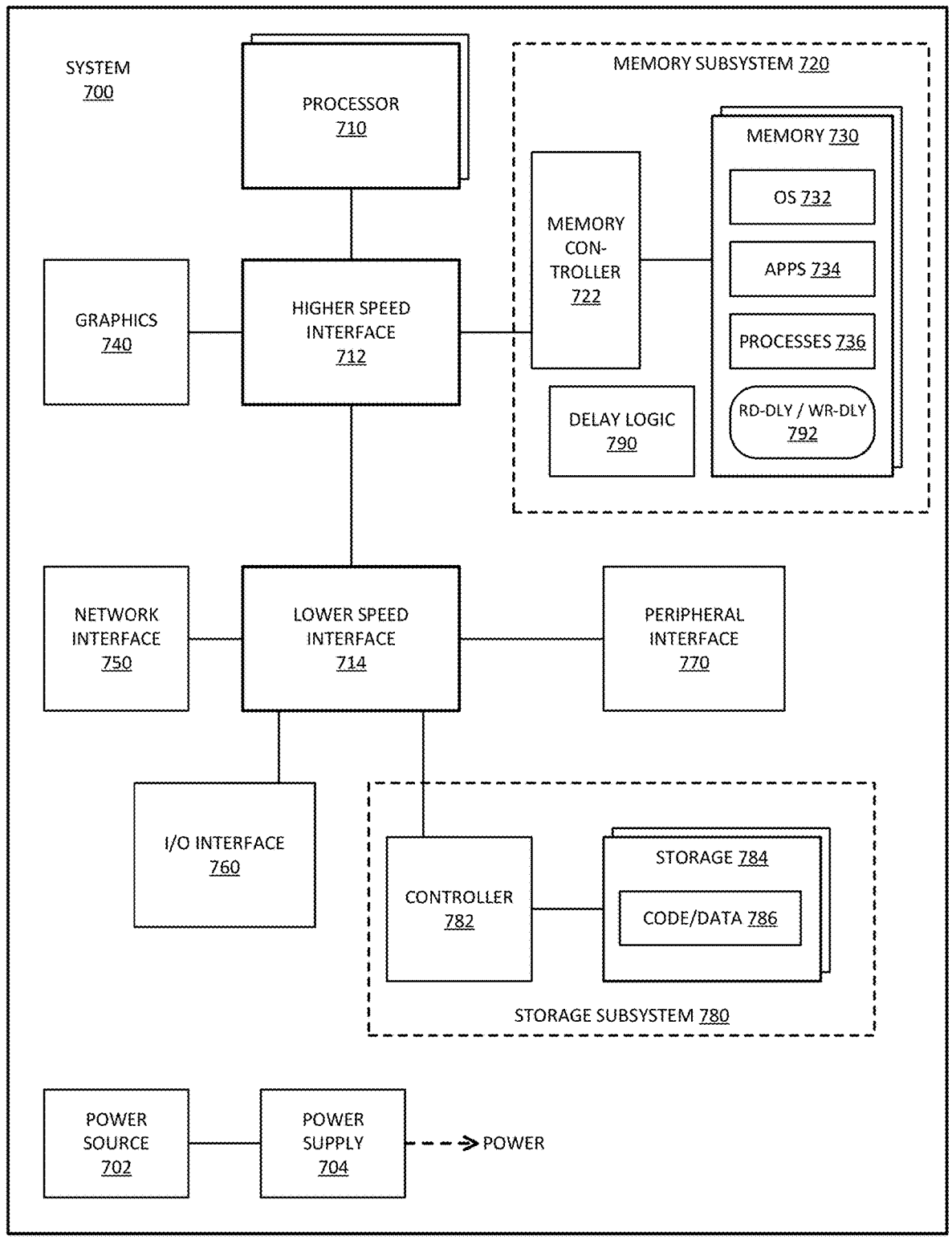
FIG. 7 is a block diagram of an example of a computing system in which selectable write delay can be implemented.

FIG. 7 is a block diagram of an example of a computing system in which selectable write delay can be implemented. System 700 represents a computing device in accordance with any example herein, and can be a laptop computer, a desktop computer, a tablet computer, a server, a gaming or entertainment control system, embedded computing device, or other electronic device. System 700 provides an example of a system in accordance with system 100 of FIG. 1, system 202 of FIG. 2A, or system 204 of FIG. 2B.

In one example, memory 730 represents memory that has asymmetry between read command to data bus utilization delay (read delay) and write command to data bus utilization delay (write delay). RD-DLY represents the read delay and WR-DLY represents the write delay. RD-DLY/WR-DLY 792 represents the delay to be applied for writes to memory 730. In one example, the write delay is selectable, either to be unmatched with respect to read delay, or to be matched with respect to read delay. The selection and application of write delay can be in accordance with any example herein. Delay logic 790 represents logic in memory subsystem 720 to select the write delay mode and apply the selected write delay to memory access transactions. Delay logic 790 can represent logic in memory controller 722 to apply the write delay and determine how to schedule commands and when to send write data on the data bus. Delay logic 790 can represent logic in memory 730 to apply the write delay mode and add delay to write commands to comply with the selected mode.

System 700 includes processor 710 can include any type of microprocessor, central processing unit (CPU), graphics processing unit (GPU), processing core, or other processing hardware, or a combination, to provide processing or execution of instructions for system 700. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or a combination of such devices.

In one example, system 700 includes interface 712 coupled to processor 710, which can represent a higher speed interface or a high throughput interface for system components that need higher bandwidth connections, such as memory subsystem 720 or graphics interface components 740. Interface 712 represents an interface circuit, which can be a standalone component or integrated onto a processor die. Interface 712 can be integrated as a circuit onto the processor die or integrated as a component on a system on a chip. Where present, graphics interface 740 interfaces to graphics components for providing a visual display to a user of system 700. Graphics interface 740 can be a standalone component or integrated onto the processor die or system on a chip. In one example, graphics interface 740 can drive a high definition (HD) display or ultra high definition (UHD) display that provides an output to a user. In one example, the display can include a touchscreen display. In one example, graphics interface 740 generates a display based on data stored in memory 730 or based on operations executed by processor 710 or both.

Memory subsystem 720 represents the main memory of system 700, and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, 3DXP (three-dimensional crosspoint), or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710, such as integrated onto the processor die or a system on a chip.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other bus, or a combination.

In one example, system 700 includes interface 714, which can be coupled to interface 712. Interface 714 can be a lower speed interface than interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can exchange data with a remote device, which can include sending data stored in memory or receiving data to be stored in memory.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, 3DXP, or optical based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one example, storage subsystem 780 includes controller 782 to interface with storage 784. In one example controller 782 is a physical part of interface 714 or processor 710, or can include circuits or logic in both processor 710 and interface 714.

Power source 702 provides power to the components of system 700. More specifically, power source 702 typically interfaces to one or multiple power supplies 704 in system 700 to provide power to the components of system 700. In one example, power supply 704 includes an AC to DC (alternating current to direct current) adapter to plug into a wall outlet. Such AC power can be renewable energy (e.g., solar power) power source 702. In one example, power source 702 includes a DC power source, such as an external AC to DC converter. In one example, power source 702 or power supply 704 includes wireless charging hardware to charge via proximity to a charging field. In one example, power source 702 can include an internal battery or fuel cell source.

Figure 8:
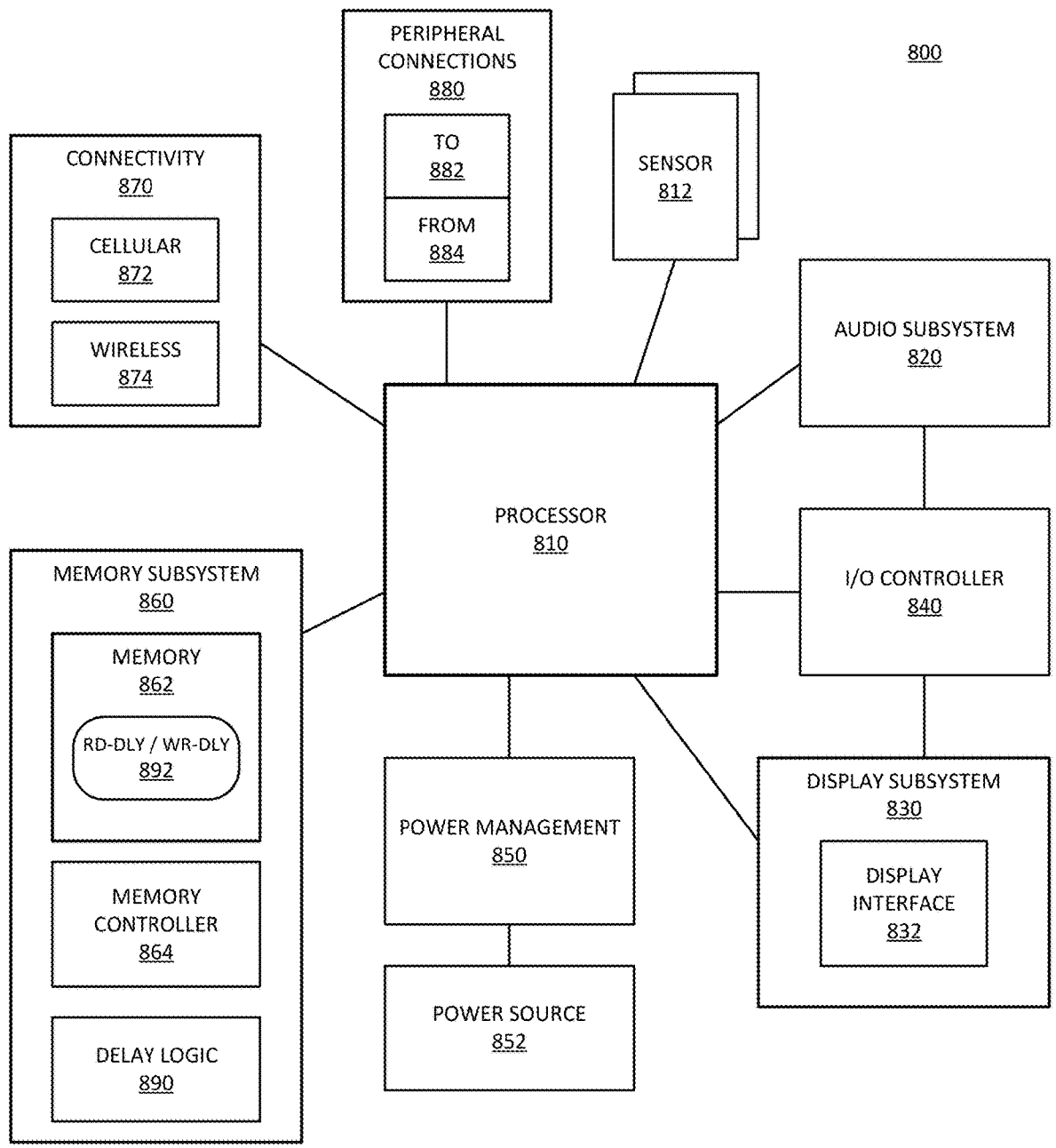
FIG. 8 is a block diagram of an example of a mobile device in which selectable write delay can be implemented.

FIG. 8 is a block diagram of an example of a mobile device in which selectable write delay can be implemented. System 800 represents a mobile computing device, such as a computing tablet, a mobile phone or smartphone, wearable computing device, or other mobile device, or an embedded computing device. It will be understood that certain of the components are shown generally, and not all components of such a device are shown in system 800. System 800 provides an example of a system in accordance with system 100 of FIG. 1, system 202 of FIG. 2A, or system 204 of FIG. 2B.

In one example, memory 862 represents memory that has asymmetry between read command to data bus utilization delay (read delay) and write command to data bus utilization delay (write delay). RD-DLY represents the read delay and WR-DLY represents the write delay. RD-DLY/WR-DLY 892 represents the delay to be applied for writes to memory 862. In one example, the write delay is selectable, either to be unmatched with respect to read delay, or to be matched with respect to read delay. The selection and application of write delay can be in accordance with any example herein. Delay logic 890 represents logic in memory subsystem 860 to select the write delay mode and apply the selected write delay to memory access transactions. Delay logic 890 can represent logic in memory access controller 864 to apply the write delay and determine how to schedule commands and when to send write data on the data bus. Delay logic 890 can represent logic in memory 862 to apply the write delay mode and add delay to write commands to comply with the selected mode.

System 800 includes processor 810, which performs the primary processing operations of system 800. Processor 810 can include one or more physical devices, such as microprocessors, application processors, microcontrollers, programmable logic devices, or other processing means. The processing operations performed by processor 810 include the execution of an operating platform or operating system on which applications and device functions are executed. The processing operations include operations related to I/O (input/output) with a human user or with other devices, operations related to power management, operations related to connecting system 800 to another device, or a combination. The processing operations can also include operations related to audio I/O, display I/O, or other interfacing, or a combination. Processor 810 can execute data stored in memory. Processor 810 can write or edit data stored in memory.

In one example, system 800 includes one or more sensors 812. Sensors 812 represent embedded sensors or interfaces to external sensors, or a combination. Sensors 812 enable system 800 to monitor or detect one or more conditions of an environment or a device in which system 800 is implemented. Sensors 812 can include environmental sensors (such as temperature sensors, motion detectors, light detectors, cameras, chemical sensors (e.g., carbon monoxide, carbon dioxide, or other chemical sensors)), pressure sensors, accelerometers, gyroscopes, medical or physiology sensors (e.g., biosensors, heart rate monitors, or other sensors to detect physiological attributes), or other sensors, or a combination. Sensors 812 can also include sensors for biometric systems such as fingerprint recognition systems, face detection or recognition systems, or other systems that detect or recognize user features. Sensors 812 should be understood broadly, and not limiting on the many different types of sensors that could be implemented with system 800. In one example, one or more sensors 812 couples to processor 810 via a frontend circuit integrated with processor 810. In one example, one or more sensors 812 couples to processor 810 via another component of system 800.

In one example, system 800 includes audio subsystem 820, which represents hardware (e.g., audio hardware and audio circuits) and software (e.g., drivers, codecs) components associated with providing audio functions to the computing device. Audio functions can include speaker or headphone output, as well as microphone input. Devices for such functions can be integrated into system 800, or connected to system 800. In one example, a user interacts with system 800 by providing audio commands that are received and processed by processor 810.

Display subsystem 830 represents hardware (e.g., display devices) and software components (e.g., drivers) that provide a visual display for presentation to a user. In one example, the display includes tactile components or touchscreen elements for a user to interact with the computing device. Display subsystem 830 includes display interface 832, which includes the particular screen or hardware device used to provide a display to a user. In one example, display interface 832 includes logic separate from processor 810 (such as a graphics processor) to perform at least some processing related to the display. In one example, display subsystem 830 includes a touchscreen device that provides both output and input to a user. In one example, display subsystem 830 includes a high definition (HD) or ultra-high definition (UHD) display that provides an output to a user.

In one example, display subsystem includes or drives a touchscreen display. In one example, display subsystem 830 generates display information based on data stored in memory or based on operations executed by processor 810 or both.

I/O controller 840 represents hardware devices and software components related to interaction with a user. I/O controller 840 can operate to manage hardware that is part of audio subsystem 820, or display subsystem 830, or both. Additionally, I/O controller 840 illustrates a connection point for additional devices that connect to system 800 through which a user might interact with the system. For example, devices that can be attached to system 800 might include microphone devices, speaker or stereo systems, video systems or other display device, keyboard or keypad devices, buttons/switches, or other I/O devices for use with specific applications such as card readers or other devices.

As mentioned above, I/O controller 840 can interact with audio subsystem 820 or display subsystem 830 or both. For example, input through a microphone or other audio device can provide input or commands for one or more applications or functions of system 800. Additionally, audio output can be provided instead of or in addition to display output. In another example, if display subsystem includes a touchscreen, the display device also acts as an input device, which can be at least partially managed by I/O controller 840. There can also be additional buttons or switches on system 800 to provide I/O functions managed by I/O controller 840.

In one example, I/O controller 840 manages devices such as accelerometers, cameras, light sensors or other environmental sensors, gyroscopes, global positioning system (GPS), or other hardware that can be included in system 800, or sensors 812. The input can be part of direct user interaction, as well as providing environmental input to the system to influence its operations (such as filtering for noise, adjusting displays for brightness detection, applying a flash for a camera, or other features).

In one example, system 800 includes power management 850 that manages battery power usage, charging of the battery, and features related to power saving operation. Power management 850 manages power from power source 852, which provides power to the components of system 800. In one example, power source 852 includes an AC to DC (alternating current to direct current) adapter to plug into a wall outlet. Such AC power can be renewable energy (e.g., solar power, motion based power). In one example, power source 852 includes only DC power, which can be provided by a DC power source, such as an external AC to DC converter. In one example, power source 852 includes wireless charging hardware to charge via proximity to a charging field. In one example, power source 852 can include an internal battery or fuel cell source.

Memory subsystem 860 includes memory device(s) 862 for storing information in system 800. Memory subsystem 860 can include nonvolatile (state does not change if power to the memory device is interrupted) or volatile (state is indeterminate if power to the memory device is interrupted) memory devices, or a combination. Memory 860 can store application data, user data, music, photos, documents, or other data, as well as system data (whether long-term or temporary) related to the execution of the applications and functions of system 800. In one example, memory subsystem 860 includes memory controller 864 (which could also be considered part of the control of system 800, and could potentially be considered part of processor 810). Memory controller 864 includes a scheduler to generate and issue commands to control access to memory device 862.

Connectivity 870 includes hardware devices (e.g., wireless or wired connectors and communication hardware, or a combination of wired and wireless hardware) and software components (e.g., drivers, protocol stacks) to enable system 800 to communicate with external devices. The external device could be separate devices, such as other computing devices, wireless access points or base stations, as well as peripherals such as headsets, printers, or other devices. In one example, system 800 exchanges data with an external device for storage in memory or for display on a display device. The exchanged data can include data to be stored in memory, or data already stored in memory, to read, write, or edit data.

Connectivity 870 can include multiple different types of connectivity. To generalize, system 800 is illustrated with cellular connectivity 872 and wireless connectivity 874. Cellular connectivity 872 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), 5G, or other cellular service standards. Wireless connectivity 874 refers to wireless connectivity that is not cellular, and can include personal area networks (such as Bluetooth), local area networks (such as WiFi), or wide area networks (such as WiMax), or other wireless communication, or a combination. Wireless communication refers to transfer of data through the use of modulated electromagnetic radiation through a non-solid medium. Wired communication occurs through a solid communication medium.

Peripheral connections 880 include hardware interfaces and connectors, as well as software components (e.g., drivers, protocol stacks) to make peripheral connections. It will be understood that system 800 could both be a peripheral device ("to" 882) to other computing devices, as well as have peripheral devices ("from" 884) connected to it. System 800 commonly has a "docking" connector to connect to other computing devices for purposes such as managing (e.g., downloading, uploading, changing, synchronizing) content on system 800. Additionally, a docking connector can allow system 800 to connect to certain peripherals that allow system 800 to control content output, for example, to audiovisual or other systems.

In addition to a proprietary docking connector or other proprietary connection hardware, system 800 can make peripheral connections 880 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), or other type.

In general with respect to the descriptions herein, in one example a nonvolatile (NV) memory device including: an array of memory cells having an asymmetry between intrinsic read operation delay and intrinsic write operation delay; and a register to store a value to select between two modes of write operation delay, a first mode having a first write operation delay unmatched with a read operation delay, and a second mode having a second write operation delay matched to the read operation delay.

In one example, the NV memory device is to default to the first mode. In one example, the NV memory device is to default to the second mode. In one example, the register is dynamically configurable during runtime of the NV memory device. In one example, the array of memory cells comprises an array of three-dimensional crosspoint (3DXP) memory cells.

In general with respect to the descriptions herein, in one example a controller including: a hardware interface to couple to multiple nonvolatile (NV) memory devices that have an asymmetry between intrinsic read operation delay and intrinsic write operation delay; and a scheduler to schedule a command to write a value of a register of the NV memory devices, the value to select between two modes of write operation delay, a first mode having a first write operation delay unmatched with a read operation delay, and a second mode having a second write operation delay matched to the read operation delay.

In one example, the NV memory devices are to default to the first mode. In one example, the NV memory devices are to default to the second mode. In one example, the scheduler is to schedule the command to write the register to select the first mode when the scheduler has mostly write operations to send to the NV memory devices. In one example, the scheduler is to schedule the command to write the register to select the second mode when the scheduler has a mix of write operations and read operations to send to the NV memory devices. In one example, when the second mode is selected, the scheduler is to schedule commands for write operations and commands for read operations in any order. In one example, the scheduler is to schedule the command to write the value of the register dynamically during runtime of the NV memory devices. In one example, the NV memory devices are organized as multiple ranks of memory devices, and wherein the scheduler is to schedule the command to select the write operation delay per rank. In one example, scheduler is to toggle sending of commands between ranks during the write operation delay and the read operation delay. In one example, the NV memory devices comprise three-dimensional crosspoint (3DXP) memory devices.

In general with respect to the descriptions herein, in one example a method including: receiving a first command to set a value of a register to select between two modes of write operation delay for a nonvolatile (NV) memory device, a first mode having a first write operation delay unmatched with a read operation delay, and a second mode having a second write operation delay matched to the read operation delay, wherein the NV memory device has an asymmetry between intrinsic read operation delay and intrinsic write operation delay; and receiving a second command to trigger a write operation, the write operation to be executed with the write operation delay of the selected first mode or second mode.

In one example, the method further includes defaulting to the first mode. In one example, the method further includes defaulting to the second mode. In one example, receiving the first command comprises receiving the first command during runtime of the NV memory device to dynamically configure the register during runtime. In one example, the NV memory device comprises a three-dimensional crosspoint (3DXP) memory device.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. A nonvolatile (NV) memory device comprising:
   an array of memory cells having an asymmetry between intrinsic read operation delay that defines a minimum delay to access the array for a read operation and intrinsic write operation delay that defines a minimum delay to access the array for a write operation; and
   a register to store a value to select between two write modes for the array, to select between two write operation delays, a first write mode having a first write operation delay unmatched with a read operation delay, and a second write mode having a second write operation delay matched to the read operation delay.

2. The NV memory device of claim 1, wherein the NV memory device is to default to the first write mode.

3. The NV memory device of claim 1, wherein the NV memory device is to default to the second write mode.

4. The NV memory device of claim 1, wherein the register is dynamically configurable during runtime of the NV memory device.

5. The NV memory device of claim 1, wherein the array of memory cells comprises an array of three-dimensional crosspoint (3DXP) memory cells.

6. A controller comprising:
a hardware interface to couple to multiple nonvolatile (NV) memory devices that have an asymmetry between intrinsic read operation delay that defines a minimum delay to access storage media of the NV memory devices for a read operation and intrinsic write operation delay that defines a minimum delay to access storage media of the NV memory devices for a write operation; and
a scheduler to schedule a command to write a value of a register of the NV memory devices, the value to select between two write modes for the NV memory devices, to select between two write operation delays, a first write mode having a first write operation delay unmatched with a read operation delay, and a second write mode having a second write operation delay matched to the read operation delay.

7. The controller of claim 6, wherein the NV memory devices are to default to the first write mode.

8. The controller of claim 6, wherein the NV memory devices are to default to the second write mode.

9. The controller of claim 6, wherein the scheduler is to schedule the command to write the register to select the first write mode when the scheduler has mostly write operations to send to the NV memory devices.

10. The controller of claim 6, wherein the scheduler is to schedule the command to write the register to select the second write mode when the scheduler has a mix of write operations and read operations to send to the NV memory devices.

11. The controller of claim 10, wherein when the second write mode is selected, the scheduler is to schedule commands for write operations and commands for read operations in any order.

12. The controller of claim 6, wherein the scheduler is to schedule the command to write the value of the register dynamically during runtime of the NV memory devices.

13. The controller of claim 6, wherein the NV memory devices are organized as multiple ranks of memory devices, and wherein the scheduler is to schedule the command to select the write operation delay per rank.

14. The controller of claim 13, wherein the scheduler is to toggle sending of commands between ranks during the write operation delay and the read operation delay.

15. The controller of claim 6, wherein the NV memory devices comprise three-dimensional crosspoint (3DXP) memory devices.

16. A method comprising:
receiving a first command to set a value of a register to select between two write modes, to select between two write operation delays for a nonvolatile (NV) memory device, a first write mode having a first write operation delay unmatched with a read operation delay, and a second write mode having a second write operation delay matched to the read operation delay, wherein the NV memory device has an asymmetry between intrinsic read operation delay that defines a minimum delay to access storage media of the NV memory devices for a read operation and intrinsic write operation delay that defines a minimum delay to access storage media of the NV memory devices for a write operation; and
receiving a second command to trigger a write operation, the write operation to be executed with the write operation delay of the selected first write mode or second write mode.

17. The method of claim 16, further comprising defaulting to the first write mode.

18. The method of claim 16, further comprising defaulting to the second write mode.

19. The method of claim 16, wherein receiving the first command comprises receiving the first command during runtime of the NV memory device to dynamically configure the register during runtime.

20. The method of claim 16, wherein the NV memory device comprises a three-dimensional crosspoint (3DXP) memory device.

\* \* \* \* \*